(12) United States Patent
Francis et al.

(10) Patent No.: US 6,181,842 B1
(45) Date of Patent: Jan. 30, 2001

(54) POSITION DIGITIZER WAVEGUIDE ARRAY WITH INTEGRATED COLLIMATING OPTICS

(75) Inventors: Daniel A. Francis, Oakland; David S. Graham, Mountain View, both of CA (US)

(73) Assignee: Poa Sana, Inc., San Jose, CA (US)

( * ) Notice: Under 35 U.S.C. 154(b), the term of this patent shall be extended for 0 days.

(21) Appl. No.: 09/480,342

(22) Filed: Jan. 10, 2000

(51) Int. Cl.$^7$ ..................................................... G02B 6/12
(52) U.S. Cl. ............................................................. 385/14
(58) Field of Search .............................. 385/4; 359/276, 359/277, 289, 619, 621, 710; 372/101, 50, 107; 257/88, 98; 369/44.12, 44.23, 44.28, 44.29, 112

(56) References Cited

U.S. PATENT DOCUMENTS

| | | | |
|---|---|---|---|
| 4,848,879 | * | 7/1989 | Nishimura et al. .................... 359/289 |
| 5,119,448 | * | 6/1992 | Schaefer et al. .......................... 385/4 |
| 5,465,265 | * | 11/1995 | Ota ........................................ 372/101 |
| 5,485,318 | * | 1/1996 | Lebby et al. .......................... 359/811 |
| 5,835,458 | * | 11/1998 | Bischel et al. .................... 369/44.12 |

* cited by examiner

*Primary Examiner*—Akm E. Ullah
(74) *Attorney, Agent, or Firm*—Paul Hentzel

(57) ABSTRACT

XY position digitizer 10 has an X send substrate 11X with an associated X receive substrate 12X, and a Y send substrate 11Y with an associated Y receive substrate 12Y, defining free space region 10F therebetween. Send waveguides 13X are embedded in the X send substrate and send waveguides 13Y are embedded in the Y send substrate. The send waveguides sends an array of send light beams 15X across the free space region to the X receive substrate. The send waveguides likewise sends an array of send light beams 15Y across the free space region to the Y receive substrate. Receive waveguides 16X are embedded in the X receive substrate and receive waveguides 16Y are embedded in the Y receive substrate in correspondence with the X and Y send waveguides. Each receive waveguide receives at least a portion of the light beam from the corresponding send waveguide. An array of X send optical systems 18X are embedded in the X send substrate. One send optical system is in precise optical alignment with each send waveguide, for enhancing the collimation of the constrained send light from that aligned send waveguide.

45 Claims, 7 Drawing Sheets

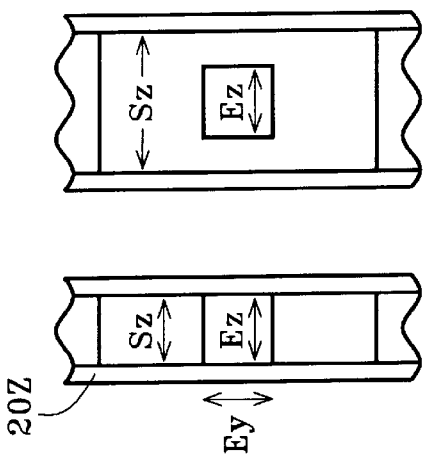
FIG 2C
FIG 2B
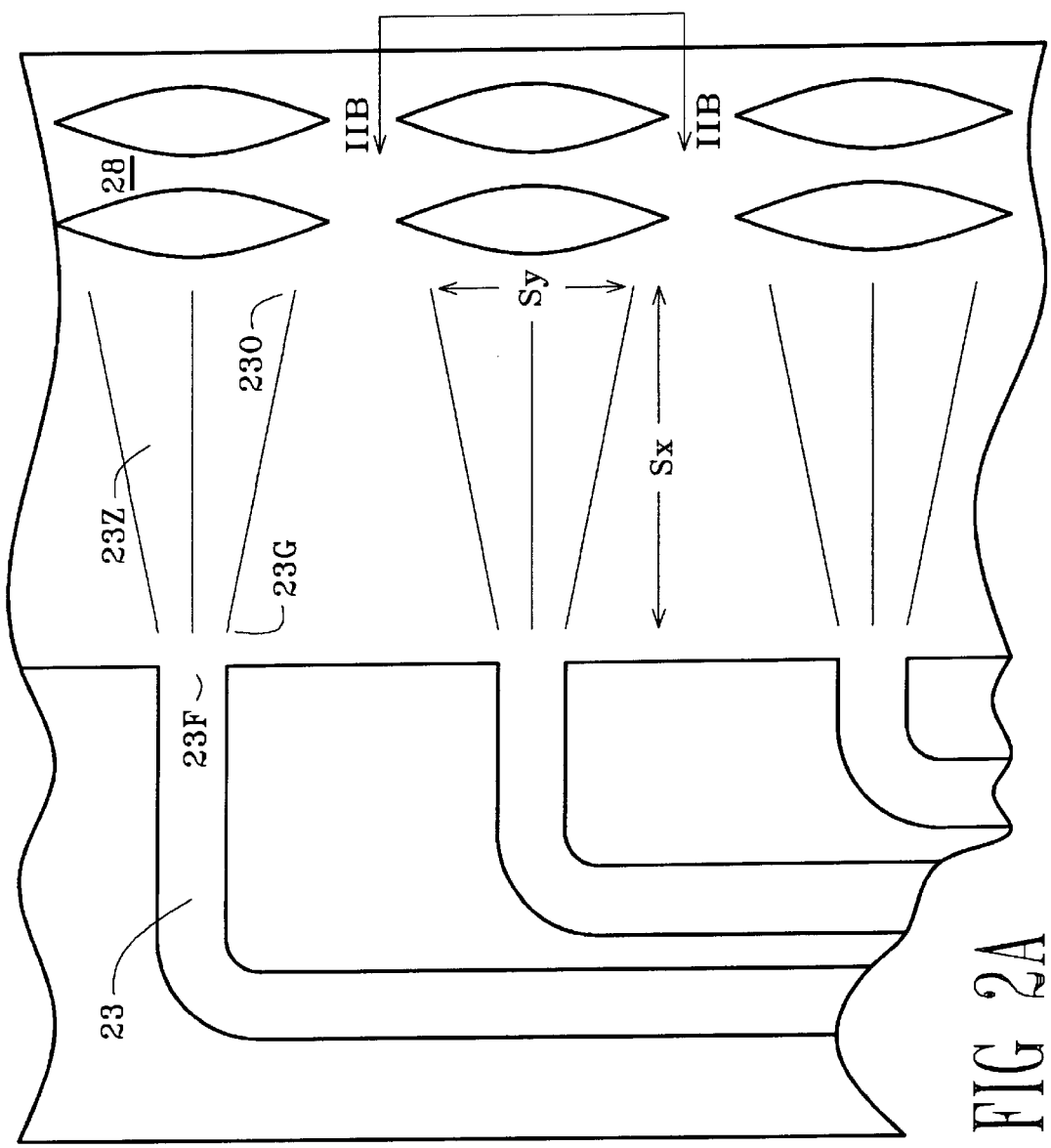
FIG 2A

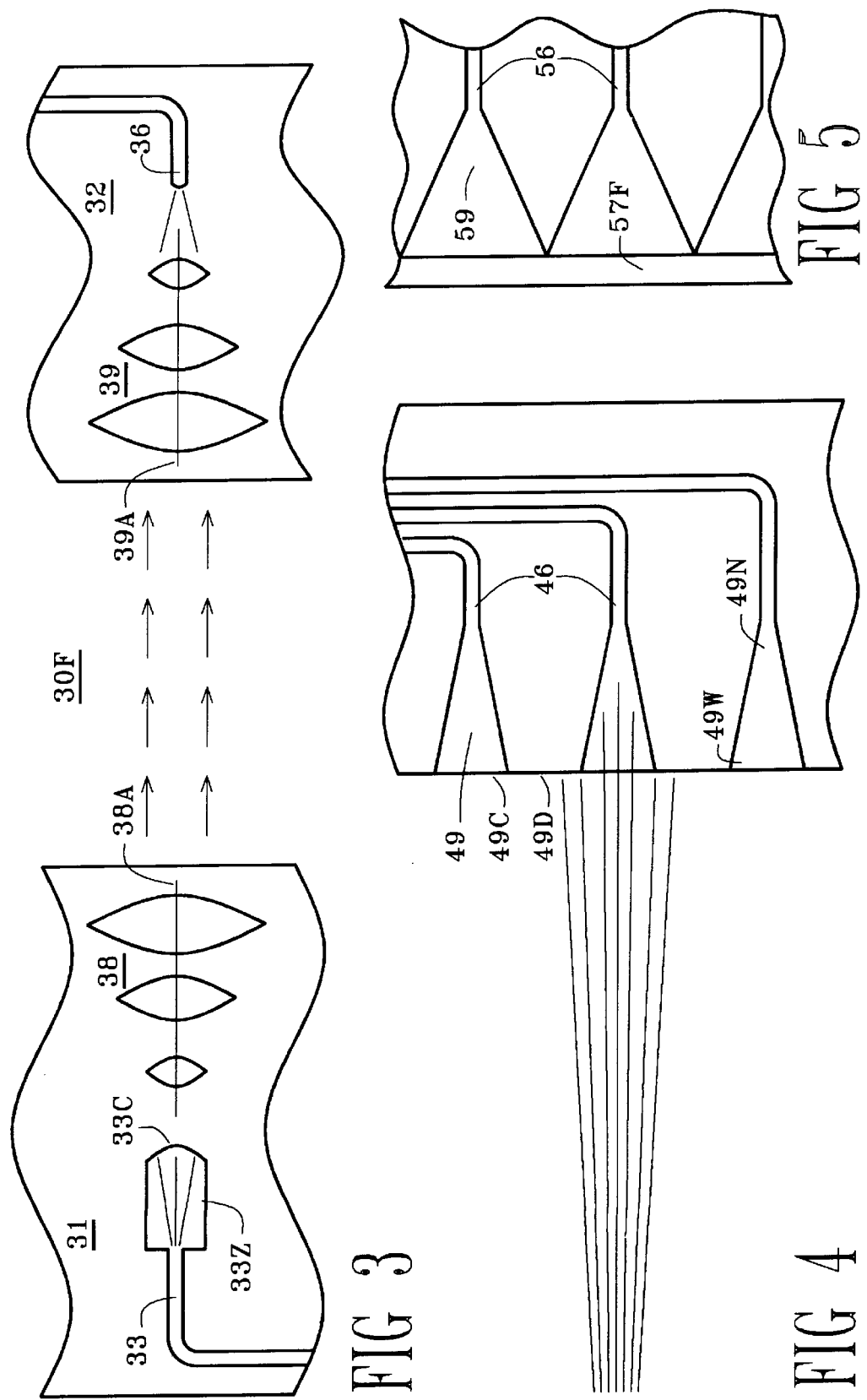

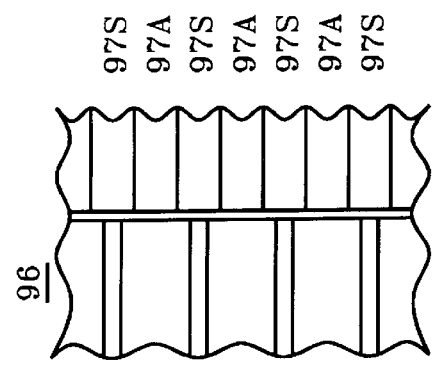
FIG. 9
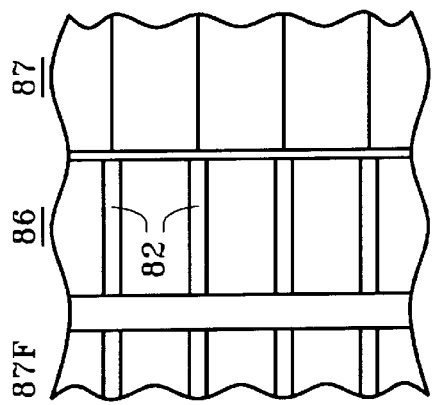
FIG. 8
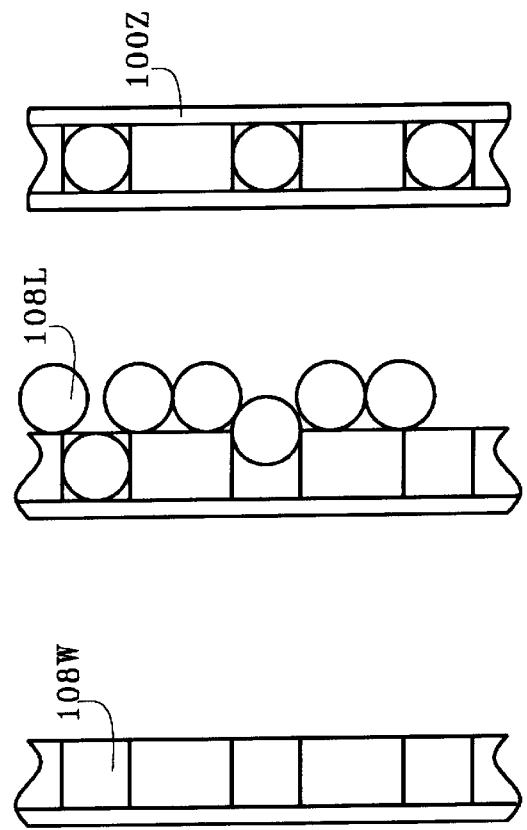

POSITION DIGITIZER WAVEGUIDE ARRAY WITH INTEGRATED COLLIMATING OPTICS

TECHNICAL FIELD

This invention relates to waveguide arrays for digitizing user input positions, and more particularly such arrays with collimating optics integrated into a one piece structure with the arrays.

BACKGROUND

Heretofore digitizing arrays have employed external collimating optics for focusing an array of light beams propagating from a send waveguide array to a receive array. The collimating optics were typically an array of collimating lenses which was secured to the send array during assembly. The collimating array was not an integral part of the waveguide array, and did not have a precisely defined position relative to the waveguides. During assembly, the optics were manually (or mechanically) placed next to the waveguides for securing. Precise optical alignment under such unrestrained conditions was difficult resulting in misalignment. This assembly misalignment introduced a corresponding indexing error between the waveguides and the optics which degraded the collimation causing limited the position resolution of the light beams. However, the prior art light beam density was sufficient for selecting icon symbols from a displayed menu.

SUMMARY

It is therefore an object of this invention to provide a waveguide array for a position digitizer with optics integrated into a one piece structure with the waveguides defining a precise and fixed position relationship therebetween.

It is another object of this invention to provide such a structure in which the optics have a predetermined template position relationship with the waveguides.

It is a further object of this invention to provide such a structure in which the optics are physically embedded in the waveguide support substrate and do not require assembly.

It is a further object of this invention to provide such a structure in which the optics are in improved alignment with the waveguides.

It is a further object of this invention to provide such a structure in which the end of each waveguide is contoured to cooperate with the optics.

It is a further object of this invention to provide such a structure in which the send light spreads prior to collimation.

It is a further object of this invention to provide such a structure in which the digitizing light beams have improved collimation and/or collection.

It is a further object of this invention to provide such a structure in which the light beams have reduced cross-talk therebetween.

It is a further object of this invention to provide such a structure in which the detected light has a higher signal to noise ratio.

It is a further object of this invention to provide such a structure in which detection cells have a higher linear density than the receive waveguides.

Briefly, these and other objects of the present invention are accomplished by providing a send substrate and an opposed receive substrate spaced from the send substrate defining a free space region therebetween. Send waveguides are embedded in the send substrate. Each send waveguide has a free space end proximate the free space region and a light source end, and guides constrained send light from the source end to the space end. The space ends of the send waveguides form a parallel send array for sending a generally parallel array of unconstrained send light beams across the free space region to the receive substrate. Corresponding receive waveguides are embedded in the receive substrate. Each receive waveguide has a free space end proximate the free space region and a light detect end, and guides constrained receive light from the space end to the detect end. The space ends of the receive waveguides form a parallel receive array, and are in optical association with the corresponding send waveguide of the send array. Each receive waveguide receives at least a portion of the light beam from the corresponding send waveguide, which becomes constrained receive light in that receive waveguide. An array of send optical systems are embedded in the send substrate between the send array and the free space region. One send optical system is in an optically aligned fixed position relative to each send waveguide. The optical system enhances the collimation of the constrained send light from that aligned send waveguide, for enhancing the collimation of the light beams crossing the free space region. Thus, a higher portion of the light beam is received by the corresponding receive waveguide.

BRIEF DESCRIPTION OF THE DRAWINGS

Further objects and advantages of the present digitizer and the operation of optical systems will become apparent from the following detailed description and drawings (not drawn to scale) in which:

FIG. 2A is a fragmentary view of three send waveguides 23 each with a integrated send optical system 28;

FIG. 2B is an end view of one send waveguide taken along lines IIB—IIB of FIG. 2A showing Z dimensions;

FIG. 2C is an end view of a thicker send waveguide larger Z dimensions;

FIG. 3 is a fragmentary view of one send waveguide 33 and corresponding receive waveguide 36 showing send optics 38 and receive optics 39;

FIG. 4 is a fragmentary view of three receive waveguides 46 employing spaced collection flares 49 as receive optics;

FIG. 5 is a fragmentary view of three receive waveguides 56 employing three continuous collection flares 59 as receive optics;

FIG. 8 is a fragmentary view of three detection cells 87 in alignment with three receive waveguides;

FIG. 9 is a fragmentary view of three active detection cells 97A in alignment with three receive waveguides 96 and four inactive spacing cell bridging the waveguides;

FIG. 10A is fragmentary plan view of three waveguides 103 with add-on lenses 108L mounted in well indentations 108W;

FIG. 10B is an elevational view taken along lines XB—XB of FIG. 10A of the three waveguides before completion;

FIG. 10C is an elevational view of the three waveguides of FIG. 10B showing spherical lenses rolling into the well indentation;

FIG. 10D is an elevational view of the three waveguides after completion showing Z cladding 100Z.

Figure 1A:
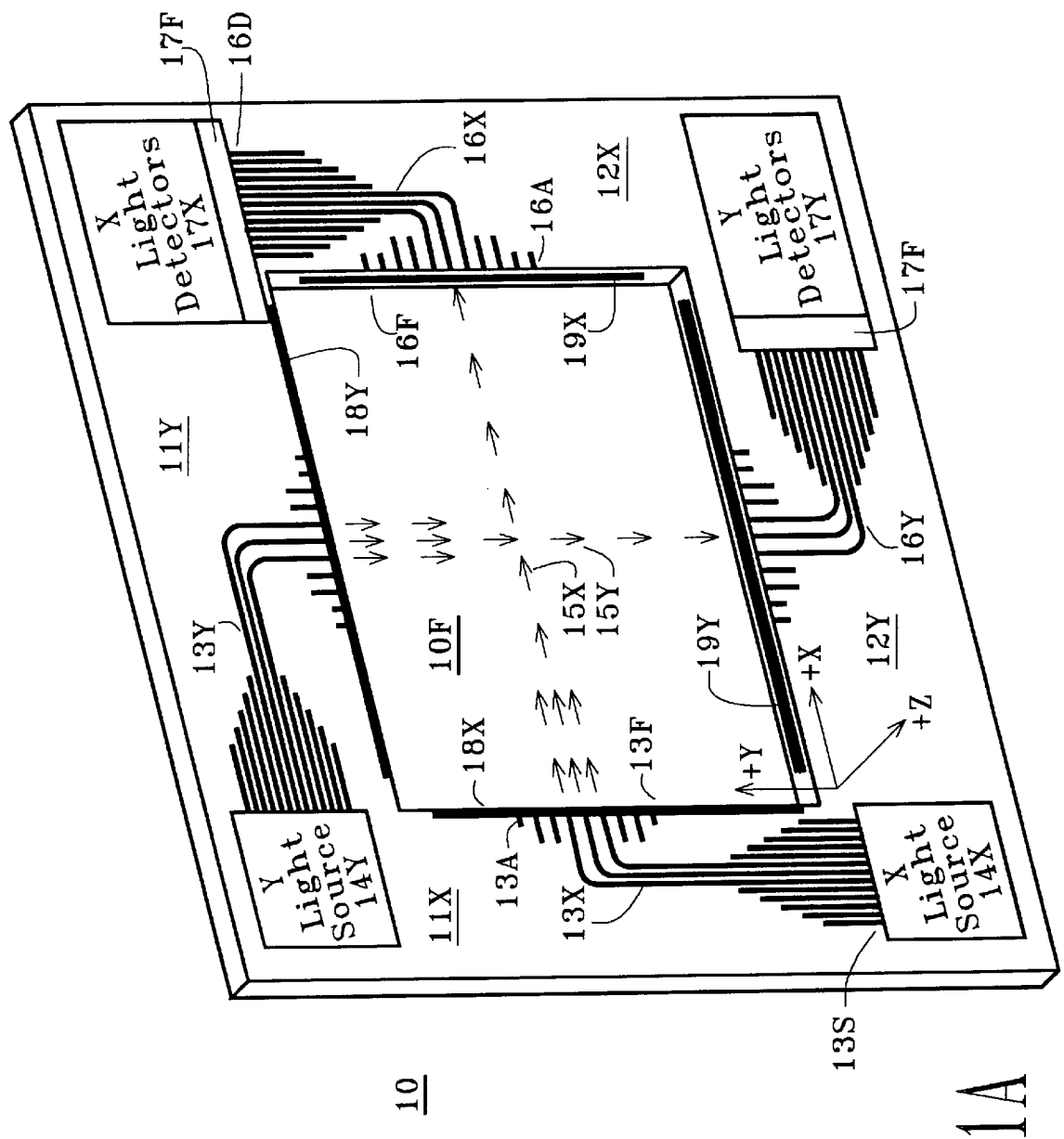
FIG. 1A is a schematic type perspective view of XY digitizer 10 showing X and Y waveguides and free space 10F therebetween.

The first digit of each reference numeral in the above figures indicates the figure in which that element is most prominently shown. The second digit indicates related structural elements, and a final letter (when used) indicates a sub-portion of an element.

REFERENCE NUMERALS IN DRAWINGS

The table below lists all of the reference numerals employed in the figures, and identifies the element designated to by each numeral.

10 XY Digitizer 10
10F Free Space 10F
11X X Send Substrate 11X
11Y Y Send Substrate 11Y
12X X Receive Substrate 12X
12Y Y Receive Substrate 12Y
13A X and Y Parallel Send Arrays 13A
13F Free Space Ends 13F
13S Light Source Ends 13S
13X X Send Waveguides 13X
13Y Y Send Waveguides 13Y
14 Single Light Source 14
14X X Light Source 14X
14Y Y Light Source 14Y
15X X Send Light Beams 15X
15Y Y Send Light Beams 15Y
16A X and Y Parallel Receive Arrays 16A
16D Light Detect Ends 16D
16F Free Space Ends 16F
16X X Receive Waveguides 16X
16Y Y Receive Waveguides 16Y
17F X and Y Light Filters 17F
17 Single Light Detector Array 17
17X X Light Detector Array 17X
17Y Y Light Detector Array 17Y
18X X Send Optical Systems 18X
18Y Y Send Optical Systems 18Y
19X X Receive Optical Systems 19X
19Y Y Receive Optical Systems 19Y
20Z Z Cladding Covers 20Z
23 Send Waveguide 23
23Z Light Spread Zones 23Z
23F Free Space End 23F
23G Waveguide End 23G
23O Optical End 23O
28 Send Optical System 28
30F Free Space Region 30F
31 Send Substrate 31
32 Receive Substrate 32
33 Send Waveguide 33
33C Convex Surface 33C
33Z Spread Zone 33Z
36 Receive Waveguide 36
38 Send Optics 38
38A Common Optical Axis 38A
39 Receive Optics 39
39A Common Optical Axis 39A
46 Receive Waveguides 46
49 Spaced Collection Flares 49
49C Collection Window 49C
49D Dead Sector 49D
49N Narrow End 49N
49W Wide End 49W
56 Receive Waveguides 56
57F Light Filter 57F
59 Continuous Collection Flares 59
61 Substrate Material 61
63 Send Waveguides 63
63N Narrow End 63N
63W Wide End 63W
63Z Taper Spread Zone 63Z
70F Free space region 70F
70M Monitor 70M
71 Send Substrate Member 71
72 Receive Substrate Member 72
73X X Send Array 73X
73Y Y Send Array 73Y
74 Common Light Source 74
76X X Receive Array 76X
76Y Y Receive Array 76Y
77 Common Light Detector 77
77F Common Light Filter 77F
82 Optical Cladding 82
86 Waveguides Array 86
87 Detection Cells 87
87F Light Filter 87F
96 Receive Waveguides 96
97A Active Detection Cell 97A
97S Spacing Cell 97S
100Z Z Cladding 100Z
101 Substrate 101
103 Waveguides 103
108L Add-on Lenses 108L
108W Well indentations 108W
115 Light Beam 115
118 Lens Elements
118A Optical Axis 118A

GENERAL EMBODIMENT—(FIG. 1A)

XY position digitizer 10 is oriented within an XYZ coordinate system (indicated by three orthogonal arrows labeled X, Y, and Z) with respect to a user interface free space region 10F. An X send substrate 11X extends generally in the Y direction (vertical in FIG. 1A). An associated X receive substrate 12X extends generally in the Y direction and is spaced from the X send substrate defining the X dimension of the free space region. A Y send substrate 11Y extends generally in the X direction (almost horizontal in FIG. 1A). An associated Y receive substrate 12Y extends generally in the X direction and is spaced from the Y send substrate defining the Y dimension of the free space region. X send waveguides 13X are embedded in the X send substrate and extend generally in the Y direction.

Y send waveguides 13Y are embedded in the Y send substrate and extending generally in the X direction. The X and Y send waveguides each have free space ends 13F proximate the free space region and light source ends 13S proximate X light source 14X and Y light source 14Y. The send waveguides guide constrained send light from the light source at the source end to the space end. The space ends of the send waveguides form X and Y parallel send arrays 13A. The X parallel send array sends a generally parallel array of unconstrained X send light beams 15X generally in the X direction across the free space region to the X receive substrate. The Y parallel send array likewise sends a generally parallel array of unconstrained Y send light beams 15Y generally in the Y direction across the free space region to the Y receive substrate.

X receive waveguides 16X are embedded in the X receive substrate and extend generally in the Y direction. Y receive waveguides 16Y are embedded in the Y receive substrate and extend generally in the X direction. The X and Y receive waveguides each have free space ends 16F proximate the free space region, and light detect ends 16D proximate X light detector array 17X and Y light detector array 17Y. The receive waveguides guide constrained receive light from the space end to the detect end. The space ends of the receive waveguides form X and Y parallel receive arrays 16A. Each receive waveguide of the receive arrays is in optical association with a corresponding send waveguide of the send arrays. That is, send light from a send waveguide affects the corresponding receive waveguide even though the position registration across the free space is not precise. Each receive waveguide receives at least a portion of the light beam from the corresponding send waveguide. The light beam then becomes constrained receive light in that receive waveguide.

Figure 1B:
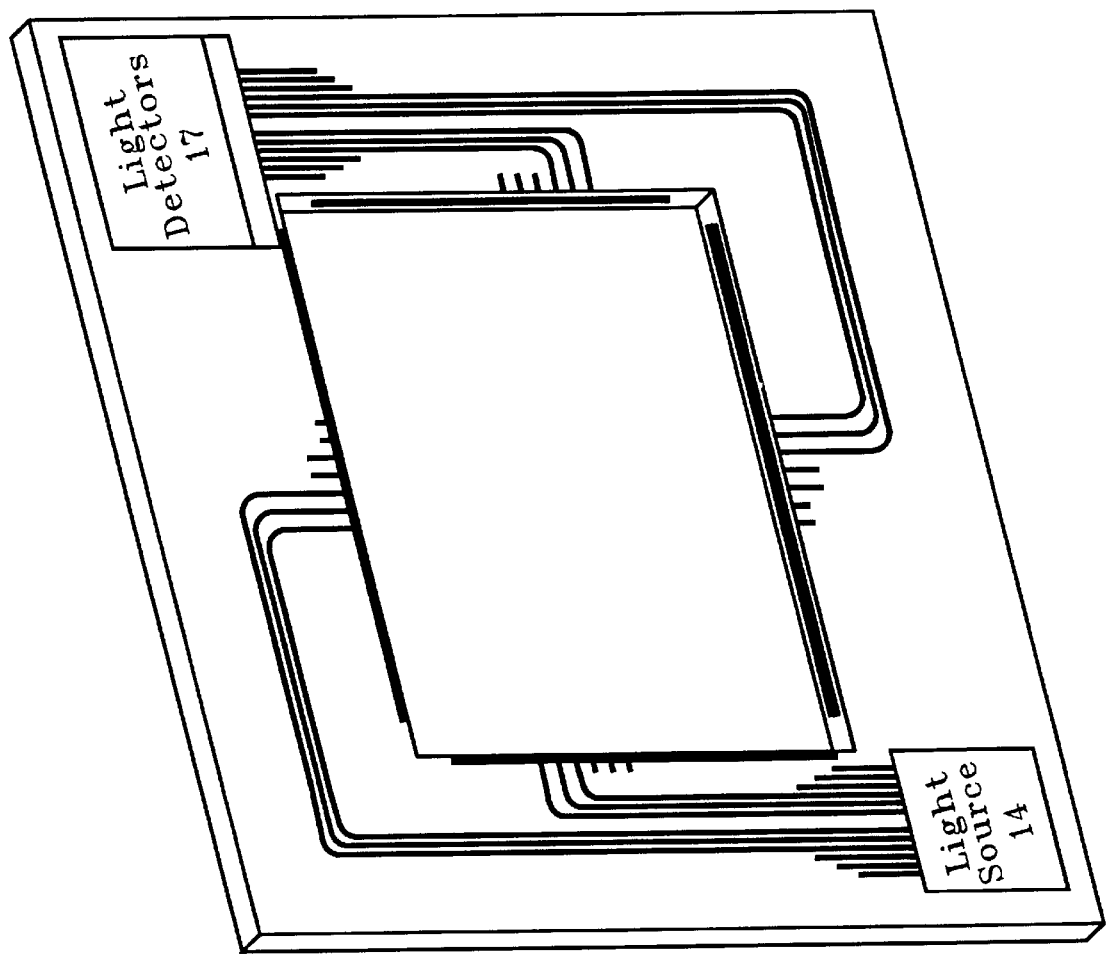
FIG. 1B is a perspective view similar to FIG. 1A showing a single light source 14 and a single light detector 17 for both the X and Y waveguides.

FIG. 1B shows an embodiment with a single light source 14 sending light into both the X and Y send waveguides, and a single light detector 17 receiving light from both the X and Y receive waveguides.

Send Optical Systems

An array of X send optical systems 18X are embedded in the X send substrate between the X send array and the free space region. An similar array of Y send optical systems 18Y are embedded in the Y send substrate between the Y send array and the free space region. One send optical system is in precise optical alignment with each send waveguide, for enhancing the collimation of the constrained send light from that aligned send waveguide. The collimation of the send light in turn enhances the collimation of the light beams crossing the free space region. This enhanced collimation causes a higher portion of the light beam to be received by the corresponding receive waveguide. The send optical systems may be any suitable optical device such as a series of spaced lenses 38 (see FIG. 3) embedded in send substrate 31. Each lens is optically aligned with the other lenses along a common optical axis 38A, which is parallel with the space end of the aligned send waveguide. That is, the lenses are positioned and oriented to establish a common center line through the optical system along which there is zero refraction bending. The series of lenses progressively enhances the collimation of the constrained send light with respect to the common center line. An eight lens example of a send optical system is given in detail in the Specific Embodiment Section.

The lenses of the send optical system may be made of a suitable optical material having an index of refraction $N_L$. The send substrate may be made of a suitable optical material having an index of refraction $N_S$ which is less than $N_L$. The send substrate material may occupy the space between the lenses to support the lenses and to establish optical contact with the surface of the lenses for providing a refractive interface. The lenses of the send optical system may be uniform in size as shown in FIG. 2A, or may become becomes progressively larger with distance from the aligned send waveguide as shown in FIG. 3.

SPREAD ZONES—(FIG. 2A)

An array of light spread zones 23Z may be provided in the send substrate, as shown in FIG. 2A. One spread zone may be positioned between free space end 23F of each send waveguide 23 and send optical system 28 aligned therewith. The spread zones have a waveguide end 23G proximate the send waveguide and an optical end 23O proximate the send optical system. Each spread zone permits off-angle light within the constrained send light from that send waveguide to spread as the send light propagates through the spread zone toward the aligned send optical system. Both the zone array and the send waveguides may be made of a suitable optical material having an index of refraction $N_G$, which is preferably the same material. The send substrate may be made of a suitable optical material having an index of refraction $N_S$ which is less than $N_G$. The optical end of the spread zone may have a shaped or contoured surface (as shown in FIG. 3), which cooperates with the send optical system for enhancing the collimation of the light beam. That is, convex surface 33C formed on the optical end of the spread zone 33Z (or on the space end of the send waveguide) may function as the first collimation stage of the send optical system. Send substrate material may occupy the space between optical end of each spread zone and the send optical system (as shown in FIG. 3). This substrate material is in optical contact with the surface of optical end and the send optical system for providing a refractive interface therebetween.

XYZ Coordinate System

The digitizer apparatus is oriented within the XYZ coordinate system as follows:
- the X send and X receive substrates extend generally in the Y direction;
- the X send and X receive waveguides embedded on the X substrates extend generally in the X direction;
- the X light beams propagate across the free space generally in the X direction;
- the Y send and Y receive substrates extend generally in the X direction;
- the Y send and Y receive waveguides embedded on the Y substrates extend generally in the Y direction;
- the Y light beams propagate across the free space generally in the Y direction;
- the direction is perpendicular
  - to both the X direction and the Y direction; the space end of each X send waveguide has
  - a Y dimension Ey and
  - a Z dimension Ez; and
- each spread zone has
  - an X dimension Sx and
  - a Y dimension Sy and
  - a Z dimension Sz.

The Sy dimension of the spread zones may be sufficiently greater than the Ey dimension of the send waveguides, to permit the spreading send light in the Y direction while propagating through the spread zone. In the embodiment shown in FIG. 2A, the Y direction spreading across spread zone 23Z is unconstrained. That is, either there is no cladding between adjacent spread zones; or if there is a cladding, the send light strikes the send optical system before spreading sufficiently to strike the cladding.

Collimation Tapers

Figure 6:
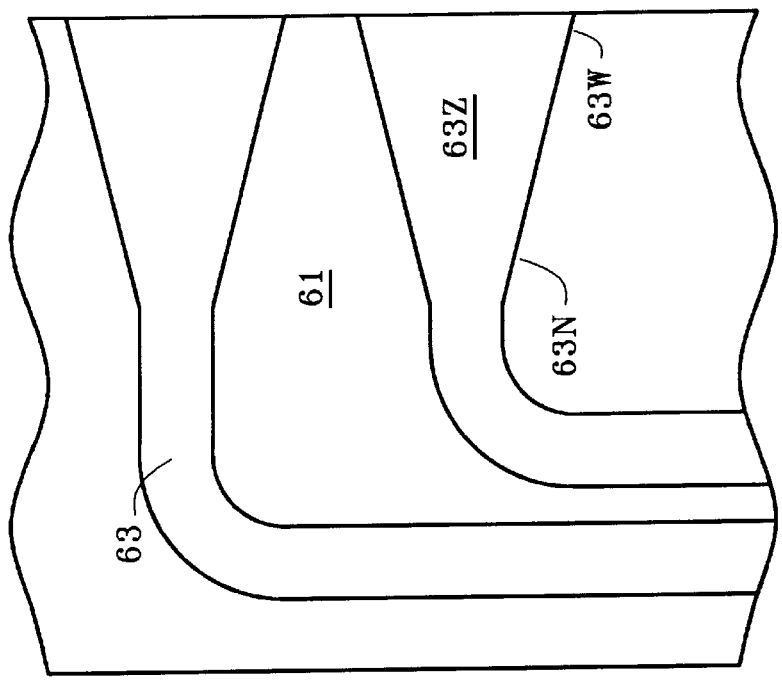
FIG. 6 is a fragmentary view of two send waveguides 63 each with a collimation taper spread zone 63Z.

Alternatively, the Y spreading may be constrained by Y cladding of substrate material 61 between adjacent spread zones 63Z as shown in FIG. 6. The Y cladding material has a thickness in the Y direction and extends in the X and Z directions, defining an X direction collimation taper within each spread zone. Each taper has a narrow end 63N proximate the send waveguide and has a wide end 63W proximate the send optical system. The tapers constrain the Y direction spreading by redirecting Y direction off-angle send light towards the send optical system to further enhance the collimation of light beams crossing the free space region.

Z Spreading

The spread zones may have Z cladding covers 20Z of substrate material as shown in FIG. 2B. The Z cladding has a thickness in the Z direction and extends in the X and Y directions along the Z sides of the spread zone array, for constraining the spreading send light against unconstrained Z spreading. The Sz dimension of each spread zone may be equal to the Ez dimension of the aligned send waveguide as shown in FIG. 2B, for constraining the spreading send light against any spreading in the Z direction. Constraining Z spreading minimizes loss of send light, conserving send light for the light beams. Further, less off-Z light is available to generate flare and other off-angle light noise. Alternatively, the Sz dimension of each spread zone may be greater than the Ez dimension of the aligned send waveguide as shown in FIG. 2C, for permitting limited spreading of the spreading send light in the Z direction. Z spreading increases registration tolerance in the Z direction between the send waveguides and the associated receive waveguides. Some Z tolerance is preferred to accommodate possible curving of digitizer 10 in the Z direction. That is, the X and Y dimensions of the digitizer may not form a strictly flat substrate. The digitizer may flex while being used or bend slightly during mounted.

RECEIVE OPTICAL SYSTEM—(FIGS. 1A and 3)

An array of adjacent X receive optical systems 19X may be fixed on X receive substrate 12X and extend generally in the Y direction as shown in FIG. 1A. An similar array of adjacent Y receive optical systems 19Y may be fixed on Y receive substrate 12Y and extend generally in the X direction. These receive optical systems are positioned between free space region 10F and X and Y receive arrays 16A. FIG. 3 shows the structure of a single receive optical systems in more detail on a larger scale. Receive optical systems 39 is embedded in receive substrate 32 between free space region 30F and receive waveguide 36. Each receive optical system is in optical alignment with a receive waveguide, and therefore also in optical association with the send waveguide corresponding to that receive waveguide. The receive optical systems condenses at least a portion of the light beam crossing the free space region from the corresponding send waveguide. Each receive optical system may be a series of spaced lenses embedded in the receive substrate, for progressively condensing the received portion of the light beam. Each lens may be optically aligned with the other lenses in the series similar to the alignment in the send optical system. The alignment is along a common optical axis 39A which is parallel with the space end of the aligned receive waveguide. The space end of the receive waveguide may have a shaped or contoured surface (as shown in FIG. 3), which cooperates with the receive optical system for enhancing the collection of the light beam. That is, such a convex surface may function as the last condensing stage of the receive optical systems.

Collection Flare

In the embodiment of FIG. 4, the array of receive optical systems is an array of collection flare guides 49, each extending from and optically aligned with a receive waveguide 46. Each flare guide has a wide end 49W facing the free space region for collecting the received portion of the light beam, and a narrow end 49N facing the aligned receive waveguide for presenting the collected received light to the aligned receive waveguide. The collection flare guides may be spaced from the adjacent collection flare guides (as shown in FIG. 4) defining a dead sector 49D between adjacent flare guides and defining a collection window 49C at each flare guide. The dead sectors scatter marginally collimated light in the light beams crossing the free space region. The collection windows collect adequately collimated light in the light beams. This selective collection and rejection of light reduces interference (cross-talk) between adjacent beams collected by the flare guides. Alternatively, each collection flare guide 59 may be flush with the adjacent flare guides defining continuous collection windows as shown in FIG. 5. These continuous flare guides collect both marginally collimated light and adequately collimated light in the light beams to conserve send light and increase registration toleration in the Y direction.

OPTICAL ALIGNMENT

Precise optical alignment between the waveguides and the optical systems increases the effectiveness of the optics for enhancing the light collimation and collection. Such precision may be achieved by fixing the waveguide array and optical system array on or in the substrate through the use of templates during the manufacture of the waveguide digitizer. Each waveguide becomes permanently positioned relative to one of the optical systems within a single integrated fabrication. This optical alignment is inherent in the manufacturing process and does not rely on mechanical positioning.

Embossing through die stamping is one technique for integrating a waveguide array and an optical system array on the same substrate with template precision. Fine furrow and well indentations are impressed into a plastic like substrate under temperature and pressure using technology similar to stamping phonograph records. The indentations are formed by displacing or compressing the substrate material. The position, shape, cross section, and depth of each waveguide and optical system are precisely defined by the stamping die. The waveguides are embedded in the furrow indentations, and the optical systems are embedded in the well indentations. This embedding is accomplished by filling the furrow indentations with a low viscosity liquid which becomes the waveguides, and filling the well indentations with a low viscosity liquid which becomes the optical systems. As the liquids cure or cool, they become solid material having the desired optical properties. The optical system liquid may be the same as the waveguide liquid to provide solid material having the same index of refraction. Alternatively, a different liquid may be employed to provide a different index of refraction.

Other suitable template type embedding treatments such as low pressure molding, pattern etching, engraving, and laser cutting may be employed. A strip loaded or laminated waveguide may be formed by pressing a thin layer of waveguide material against the substrate under pressure and heat. The waveguide material becomes plastic and creeps into the furrows and wells which may be about 10 microns deep, to form a waveguide which is closed along the top and bottom and along the lower portion of the sides. The non-closure gap along the upper portion of the sides is about one third of the waveguide depth, perhaps three microns; and does not permit light loss into the adjacent waveguide. The substrate may be treated on both sides to provide additional arrays of waveguides and optical systems.

Lithographic fabrication is another technique for integrating the waveguides and optical systems on the same substrate with template precision. The send waveguides are embedded by fabricating furrow channels in the send substrate. Likewise, the send optical systems are embedded by fabricating well channels in the send substrate. The channels and cladding are formed by altering local substrate material through lithography, which precisely integrates the position of the waveguides and the optical systems relative to one another within the substrate. Standard masking, photo-resist, and etching procedures may be employed to precisely define the positions to within 0.5 microns in wide and 0.25 microns in depth. The index of refraction of each channel and substrate and cladding may be determined by exposure to controlled UV radiations.

Resolution

The high precision of these manufacturing techniques supports high resolution arrays with closely spaced fine light beams. The precision and resolution of die stamping embossing and lithographic fabrication may be as close as one tenth of a micron, as limited by the underlying etching step. Both techniques provide a light beam array much finer than required for selecting menu icons from a raster scan display. The XY digitizer may be employed in small feature application such as handwriting recognition.

Figure 7:
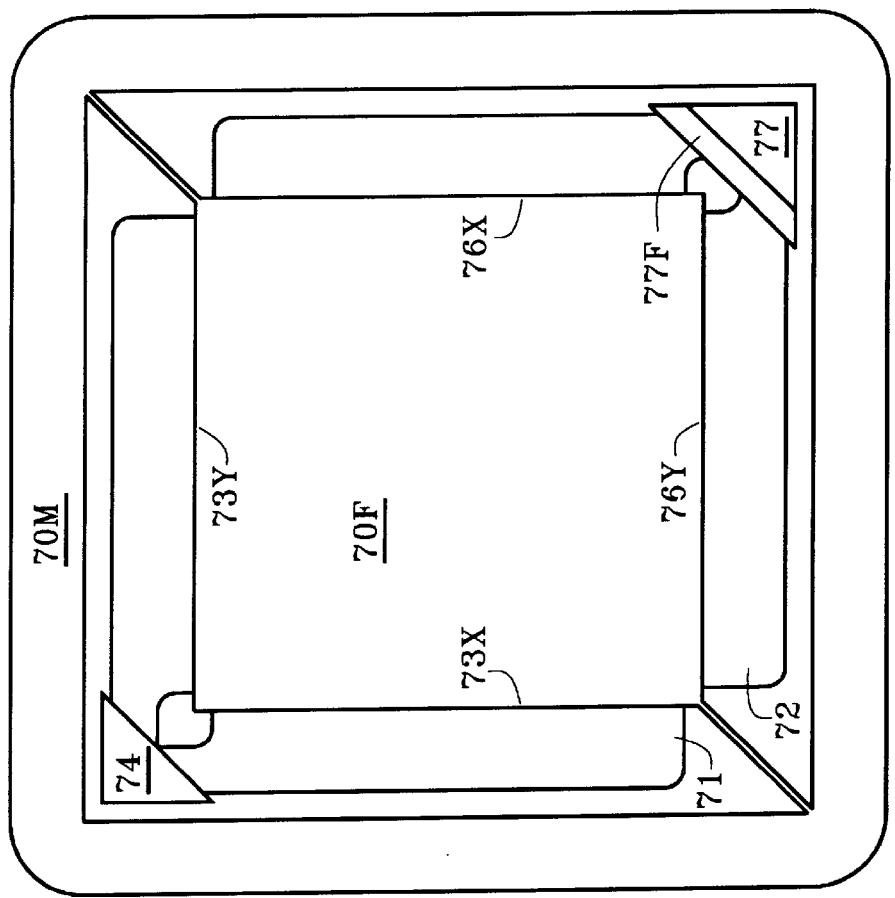
FIG. 7 is a plan view of an XY digitizer having two substrate members 71 and 72 mounted on monitor 70M.

The X and Y send substrates and the X and Y receive substrates may form a four sided monolithic structure as shown in FIG. 1A. The rigidness of the monolithic structure in the X and Y directions limits potential mis-registration between a send array and the associated receive array across the free space. Alternatively, the digitizer may be formed by multiple separate substrate members such as four substrates, one for each side. FIG. 7 shows an embodiment with two substrate members. Send substrate 71 supports X and Y send arrays 73X and 73Y and common light source 74. Receive substrate 72 supports X and Y receive arrays 76X and 76Y and common light detector 77. The digitizer may be employed in a stand alone digitizer pad, or mounted on display monitor 70M as shown in FIG. 7. Free space region 70F between the substrates coincides with the display screen of the monitor.

LIGHTS, DETECTORS, FILTERS

Light Sources

The light sources are in light communication with the source end of the send waveguides for providing the send light which forms the light beams. Two light sources may be employed mounted in separate corners of the substrate as shown in the embodiment of FIG. 1A. X light source 14X in light communication with the source end of X send waveguides 13X provides send light forming X light beams 15X. Y light source 14Y in light communication with the source end of Y send waveguides 13Y provides send light forming Y light beams 15Y. Alternatively, a single light source may provide the light for both the X and Y light beams as shown in the embodiment of FIG. 7. The light sources may be any suitable specific wavelength light emitting device such as an LED and a laser, or a wider spectrum device such as an incandescent lamp.

Light Detector Arrays

An array of light detector cells in light communication with the detect end of the receive waveguides individually detect the constrained receive light guided by each receive waveguide. Two detector arrays may be employed mounted in separate corners as shown in the embodiment of FIG. 1A. X light detector array 17X in light communication with the detect end of X receive waveguides 16X detect X constrained receive light. Y light detector array 17Y in light communication with the detect end of Y receive waveguides 16Y detect Y constrained receive light. Alternatively, a single detector array may detect both the X and Y received light as shown in the embodiment of FIG. 7. The detector cells may be any suitable light sensing array such as photo-CCDs, photo CMOS devices, and photo-transistors.

Limited Misalignment

The receive waveguides may be of a suitable optical material having an index of refraction $N_G$; and the receive substrate may be made of a suitable optical material having an index of refraction $N_S$ which is less than $N_G$. The substrate optical material may extend between adjacent waveguides in array 86 forming an optical cladding 82, which spaces adjacent waveguides as shown in the embodiment of FIG. 8. These inter-guide spacings permit limited assembly misalignment of the detector cell array 87 with respect to the detect ends of the receive waveguides. The guide/cell interface may be slightly off and each cell still receives light from a single waveguide, without cross-over interference (cross-talk) from the adjacent waveguides. If desired, an optical coupler substance such as oil may be employed along the guide/cell interface to enhance the light coupling from the waveguide to the detector cells. The waveguides may abut directly onto the cells to minimize spreading, or a guide/cell spacing may be employed. Preferably, such a spacing is less than the width of the waveguide. Additional misalignment may be permitted by a cell density in the light detector cell array which is greater than the guide density of the detect ends of the receive waveguides. When the cells are smaller than the waveguides some cells may be inactive and function as inter-cell spacings. In the embodiment of FIG. 9, cell array has a density twice the density of waveguide array 96. Each cell is one-half as large as the associated waveguide leaving an entire inactive cell to function as spacing. Every other cell is a spacing cell 97S which bridges two adjacent waveguides and receives cross-talk light. However, this contaminated light is lost because these spacing cells are not active. Active cells 97A between the bridging cells are fully aligned with a waveguide and receive light from only that waveguide. The difficulty of assembly misalignment and optical interface may be avoided by integrating the detector cells directly on the receive waveguide substrate through lithography.

Light Filters

Light filters may be employed in light communication with the receive waveguides for filtering the constrained receive light to remove any unwanted wavelengths. The light beams are exposed to the environment while crossing the free space. Some ambient wide spectrum light may leak into the digitizer, especially along the exposed receive optical arrays. The filters remove "noise" light to increase the signal-to-noise ratio of the constrained receive light presented to the detectors. Two light filters, X and Y light filters 17F, may be employed as shown in the embodiment of FIG. 1A. The X light filter is in light communication with the detect end of X receive waveguides 16X and filters X constrained receive light. The Y light filter is in light communication with the detect end of Y receive waveguide 16Y and filters Y constrained receive light. Alternatively, a common light filter 77F may filter both the X and Y received light as shown in the single detector array embodiment of FIG. 7.

The light filters may be any suitable wavelength selective device, such as absorption filters, thin film filters, and band pass filters in general. The absorption filters employ a small amount of absorptive material such as dye or carbon black which is opaque to the wavelength to be filtered out. Interference filters employ closely spaced layers of optical material having a slightly different index of refraction. Polarizing filters may be employed alternatively rotated in-phase and out-of-phase on the send waveguides, with matched polarized filters on the corresponding receive waveguide to reduce cross-talk between adjacent light beams. Distributed attenuation filtering occurs within the bulk of the waveguides due to the bandpass of the waveguide material. The detector cells may also be wavelength selective and provide another level of filtering. The light filter may be mounted at the detect end of the receive waveguide array as illustrated by X and Y light filters 17F of FIG. 1A and common light filter 77F of FIG. 7. The light filter may be mounted at the space end of the receive waveguide array as illustrated by light filter 57F of FIG. 5. Further, the light filter may be embedded in the receive waveguides between the detect end and the space end as illustrated by light filter 87F of FIG. 8.

Off-angle filtering may be employed in the optical systems to remove non-collimated light. Off-angle light entering an optical system is diverted even further off-angle and is lost into the ambient. Off-angle or spatial filtering is particularly effective in receive optical systems when the last lens of the system is small as shown in FIG. 3. In the collection flare embodiment of FIG. 4, off-angle light in the light beam does not enter collection flare 49 and is lost in dead sector 49D.

ADD-ON LENS EMBODIMENT—(FIGS. 10A B C D)

The send optical systems (and receive optical systems) may be formed by an array of well indentations 108W in substrate 101, with a add-on lens 108L mounted in each indentation as shown in the embodiment of FIG. 10A. Each well indentation is formed in the send substrate (or receive substrate) in a fixed integrated position proximate one of the waveguides. Each add-on lens is then retained in one of the integrated wells in an optically aligned position and orientation relative to that waveguide. The add-on lenses are formed separately from the substrate, and may have optical contours in all three dimensions of the lens (along the XY plane, the ZY plane, and the ZX plane). The well indentations and waveguides are most easily formed with contours only in two dimensions along the XY plane. Shaping along the ZY plane and ZX plane are more difficult with most die stamping and lithographic fabrication techniques. The add-on lenses supply the third dimension of shaping for improved collimation and collection.

The lenses mounted in the indentations may be spherical to facilitate rolling into the indentations during completion of the waveguide digitizer. FIG. 10B shows a sectional elevation view of the add-on lens embodiment of FIG. 10A prior to completion. The wells have not yet received lenses. FIG. 10C shows a sea of spherical lenses rolling across the substrate and falling into the well indentations. If desired the top edge of each well may be slightly beveled to promote roll-in mounting of the lenses. The wells may contain a "backfill" liquid which displaces the air in the well, and flows around the lenses as they fall into the wells. The backfill has an index of refraction which is preferably the same as the substrate material for maximizing light transmission therethrough. The backfill may be a curable material that hardens to secure the lens in position. FIG. 10D show a completed digitizer with the spherical lenses mounted in the wells and Z cladding cover 100Z formed over the wells. The closure structure may be provided over the optical system for retaining the lenses in the indentations after completion of the waveguide digitizer. In addition to easy rolling, the spherical lenses function equally well at all azimuth and pitch orientations, which simplifies roll-in lens mounting. The indentations may be cylindrical and of like diameter as the spherical lenses to facilitate retaining the lenses in the optically aligned position.

SPECIFIC EMBODIMENT—(FIG. 11)

Figure 11:
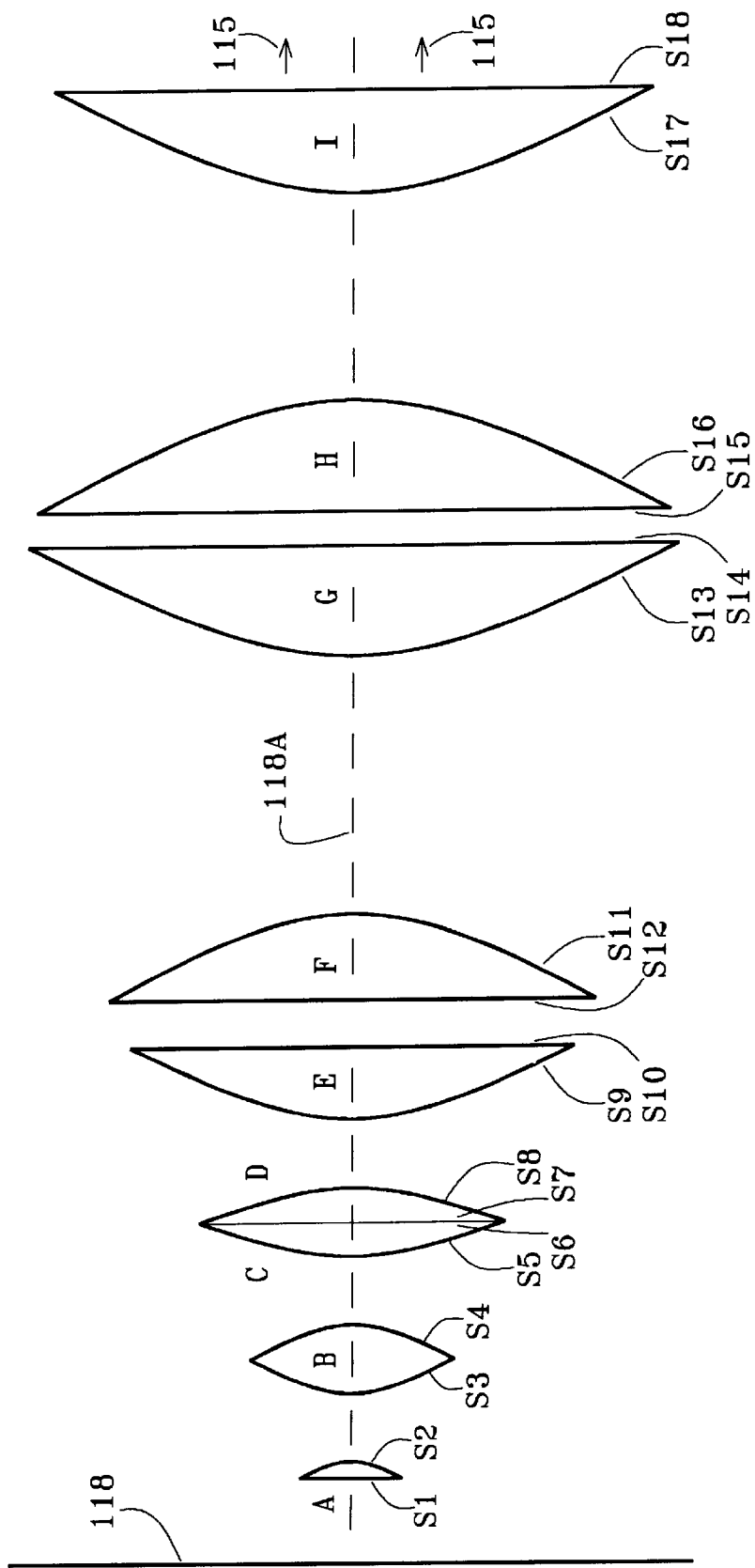
FIG. 11 is schematic view of a specific example of a nine lens optical system.

The following particulars are given as an illustrative example of a waveguide digitizer employing the complex send optical system shown in FIG. 11. Send optical system 118 has nine circular lens elements (A through I) defining eighteen optical surfaces (S1 through S18) which extend along optical axis 118A. Send light enters the optical system at input lens A and exits as light beam 115 with enhanced collimation at output lens I. The radius of curvature of each lens (in microns) is listed in the table below along with spacing (in microns) from send waveguide 118.

| Lens Surface S1-S18 | Radius of Curvature (microns) | Spacing from Origin (microns) |
|---|---|---|
| A/S1 | Flat | 250 |
| A/S2 | 50 | 300 |
| B/S3 | 100 | 500 |
| B/S4 | 100 | 700 |
| C/S5 | 175 | 900 |
| C/S6 | Flat | 1,000 |
| D/S7 | Flat | 1,000 |
| D/S8 | 175 | 1,100 |
| E/S9 | 225 | 1,300 |
| E/S10 | Flat | 1,525 |
| F/S11 | Flat | 1,650 |
| F/S12 | 250 | 1,900 |
| G/S13 | 325 | 2,650 |
| G/S14 | Flat | 2,975 |
| H/S15 | Flat | 3,085 |
| H/S16 | 315 | 3,400 |
| I/S17 | 300 | 4,000 |
| I/S18 | Flat | 4,300 |

In general, the send substrate and the receive substrate may be made of the same optical material having an index of refraction of about $N_S=1.500$. The send waveguide, the zone array, the send optical system, the receive optical systems, and the receive waveguides may all be made of the same optical material having an index of refraction of about $N_G=N_L=1.525$. The indices of refraction may vary depending on the materials and application. The index of refraction of the substrate may be lower than the index of refraction of the optical system in order to retain the light. However, in another embodiment, the index of refraction of the substrate may be higher than the index of refraction of the optical system in order to retain the light. The light source may provide light within a range of from about 788 nanometers to about 850 nanometers, preferably 820 nanometers.

In the specific embodiment, the send and receive waveguides are 8 microns across and spaced 500 microns center-to-center. The detector chip array may contain 1,000 cells or more, spaced at about eight microns center-to-center. The waveguide center-to-center spacing along the detect/source ends may be much closer than the waveguide center-to-center spacing along the optical ends to facilitate the compact detector array.

Additional information concerning a send waveguide array and a receive waveguide array is disclosed in U.S. Pat. No. 5,914,709 entitled "User Input Device For A Computer System" issued on Jun. 22, 1999 to the present inventors (application Ser. No. 08/818,774 filed on Mar. 14, 1997 assigned to the present assignee), the subject matter of which is hereby incorporated by reference in its entirety into this disclosure. The values, dimensions, materials and other information given above are not intended as defining the limitations of the invention. Numerous other applications and configurations are possible.

INDUSTRIAL APPLICABILITY

It will be apparent to those skilled in the art that the remaining objects of this invention have been achieved by providing a waveguide array for a position digitizer with optics integrated into a one piece structure with the waveguides defining a precise and fixed position relationship therebetween. Each optical system has a predetermined template position relationship with one of the waveguides. The optics are physically embedded in the waveguide support substrate and do not require assembly. Because of this integration, the optics are in improved alignment with the waveguides.

CONCLUSION

Clearly various changes may be made in the structure and embodiments shown herein without departing from the concept of the invention. Further, features of the embodiments shown in the various figures may be employed with the embodiments shown in the other figures.

Therefore, the scope of the invention is to be determined by the terminology of the following claims and the legal equivalents thereof.

We claim as our invention:

1. A waveguide apparatus, comprising:

a send substrate and an opposed receive substrate spaced from the send substrate defining a free space region therebetween;

send waveguides embedded in the send substrate, each send waveguide having a free space end proximate the free space region and a light source end and guides constrained send light from the source end to the space end, the space ends of the send waveguides forming a parallel send array for sending a generally parallel array of unconstrained send light beams across the free space region to the receive substrate;

receive waveguides embedded in the receive substrate, each receive waveguide having a free space end proximate the free space region and a light detect end and guides constrained receive light from the space end to the detect end, the space ends of the receive waveguides forming a parallel receive array, each receive waveguide of the receive array in optical association with a corresponding send waveguide of the send array for receiving at least a portion of the light beam from the corresponding send waveguide which becomes constrained receive light in that receive waveguide; and an array of send optical systems embedded in the send substrate between the send array and the free space region, one send optical system in an optically aligned fixed position relative to each send waveguide, which optical system enhances the collimation of the constrained send light from that aligned send waveguide, for enhancing the collimation of the light beams crossing the free space region causing a higher portion of the light beam to be received by the corresponding receive waveguide.

2. The waveguide apparatus of claim 1, wherein each send optical system comprises a series of spaced lenses embedded in the send substrate, each lens optically aligned with the other lenses along a common optical axis which is parallel with the space end of the aligned send waveguide, for progressively enhancing the collimation of the constrained send light with respect to the common center line.

3. The waveguide apparatus of claim 2, wherein the lenses of the send optical system are made of an optical material having an index of refraction $N_L$; and the send substrate is made of an optical material having an index of refraction $N_S$ which is less than $N_L$.

4. The waveguide apparatus of claim 3, wherein the send substrate material occupies the space between the lenses and is in optical contact with the surface of the lenses for providing a refractive interface.

5. The waveguide apparatus of claim 2, wherein the lenses of the send optical system are uniform in size.

6. The waveguide apparatus of claim 2, wherein the lenses in each series of lenses becomes progressively larger with distance from the aligned send waveguide.

7. The waveguide apparatus of claim 1, wherein each send optical system comprises:

a well indentation in the send substrate in a fixed position proximate a send waveguide; and a lens mounted in the indentation and retained in the optically aligned position relative to that send waveguide.

8. The waveguide apparatus of claim 7, wherein the lenses mounted in the indentations are spherical to facilitate rolling into the indentations during completion of the waveguide apparatus.

9. The waveguide apparatus of claim 8, wherein the indentations are cylindrical and of like diameter as the spherical lenses to facilitate retaining the lenses in the optically aligned position after completion of the waveguide apparatus.

10. The waveguide apparatus of claim 7, further comprising a closure structure over the array of send optical systems for retaining the lenses in the indentations after completion of the waveguide apparatus.

11. The waveguide apparatus of claim 1, further comprising an array of light spread zones in the send substrate, one spread zone positioned between the space end of each send waveguide and the send optical system aligned therewith, each spread zone having a waveguide end proximate the send waveguide and an optical end proximate the send optical system, for permitting off-angle light within the constrained send light from that send waveguide to spread as the send light propagates through the spread zone toward the aligned send optical system.

12. The waveguide apparatus of claim 11, wherein both the zone array and the send waveguides are made of an optical material having an index of refraction $N_G$, and the send substrate is made of an optical material having an index of refraction $N_S$ which is less than $N_G$.

13. The waveguide apparatus of claim 12, wherein the optical end of the spread zone has a convex contoured surface cooperating with the send optical system for enhancing the collimation of the light beam.

14. The waveguide apparatus of claim 12, wherein send substrate material occupies the space between optical end of each spread zone and the send optical system, and is in optical contact with the surface of optical end and the send optical system for providing a refractive interface therebetween.

15. The waveguide apparatus of claim 12, wherein the apparatus is oriented within an XYZ coordinate system in which:
the send waveguides extend generally in the X direction;
the light beams propagate generally in the X direction;
the S and R substrates extend generally in the Y direction;
the Z direction is perpendicular to both the X direction and the Y direction;
the space end of each send waveguide has
a Y dimension Ey and
a Z dimension Ez; and
each spread zone has
an X dimension Sx and
a Y dimension Sy and
a Z dimension Sz.

16. The waveguide apparatus of claim 15, wherein, the Sy dimension of each spread zone is sufficiently greater than the Ey dimension of each waveguide, to permit the spreading send light in the Y direction while propagating through the spread zone.

17. The waveguide apparatus of claim 16, wherein the Y direction spreading across the spread zone is unconstrained.

18. The waveguide apparatus of claim 16, wherein the spread zone array further comprises Y cladding of substrate material having a thickness in the Y direction and extending in the X and Z directions between adjacent spread zones, defining an X direction collimation taper for each spread zone, having a narrow end proximate the send waveguide and having a wide end proximate the send optical system, for constraining the Y direction spreading by redirecting Y direction off-angle send light towards the send optical system to further enhance the collimation of light beams crossing the free space region.

19. The waveguide apparatus of claim 16, further comprising Z cladding covers of substrate material having a thickness in the Z direction and extending in the X and Y directions along the Z sides of the spread zone array, for constraining the spreading send light against unconstrained Z spreading.

20. The waveguide apparatus of claim 19, wherein the Sz dimension of each spread zone is equal to the Ez dimension of each send waveguide, for constraining the spreading send light against any spreading in the Z direction.

21. The waveguide apparatus of claim 19, wherein the Sz dimension of each spread zone is greater than the Ez dimension of each send waveguide, for permitting limited spreading of the spreading send light in the Z direction.

22. The waveguide apparatus of claim 1, further comprising an array of adjacent receive optical systems embedded in the receive substrate between the free space region and the receive array, one receive optical system in optical alignment with each receive waveguide, for condensing at least a portion of the light beam crossing the free space region from the corresponding send waveguide which is in optical association with that receive waveguide.

23. The waveguide apparatus of claim 22, wherein each receive optical system comprises a series of spaced lenses embedded in the receive substrate, each lens optically aligned with the other lenses along a common optical axis which is parallel with the space end of the aligned receive waveguide, for progressively condensing the received portion of the light beam.

24. The waveguide apparatus of claim 22, wherein each receive optical system comprises a collection flare guide extending from the receive waveguide optically aligned therewith, having a wide end facing the free space region for collecting the received portion of the light beam, and having a narrow end facing the aligned receive waveguide for presenting the collected received light to the aligned receive waveguide.

25. The waveguide apparatus of claim 24, wherein each collection flare guide is spaced from the adjacent collection flare guides defining a dead sector between adjacent collection flare guides and defining a collection window at each collection flare guide, the dead sectors absorb marginally collimated light in the light beams, and the collection windows collect adequately collimated light in the light beams, to reduce cross-over interference of the light beams between adjacent collection flare guides.

26. The waveguide apparatus of claim 24, wherein each collection flare guide is flush with the adjacent collection flare guides defining continuous collection windows, which collect marginally collimated light and adequately collimated light in the light beam to conserve send light.

27. The waveguide apparatus of claim 1, further comprising a light source in light communication with the source end of the send waveguides for providing the send light which forms the light beams.

28. The waveguide apparatus of claim 1, further comprising an array of light detector cells in light communication with the detect end of the receive waveguides for individually detecting the constrained receive light guided by each receive waveguide.

29. The waveguide apparatus of claim 28, wherein:
the receive waveguides are made of an optical material having an index of refraction $N_G$; and
the receive substrate is made of an optical material having an index of refraction $N_S$ which is less than $N_G$; and
the substrate optical material extends between adjacent waveguides forming an optical cladding, which spaces adjacent waveguides permitting limited misalignment of the detector cell array with respect to the detect ends of the receive waveguides.

30. The waveguide apparatus of claim 28, wherein the cell density in the light detector cell array is greater than the guide density of the detect ends of the receive waveguides, to provide at least two cells per guide.

31. The waveguide apparatus of claim 1, further comprising light filter in light communication with the receive waveguides for filtering the constrained receive light.

32. The waveguide apparatus of claim 31, wherein the light filter is mounted on the detect end of the receive waveguides.

33. The waveguide apparatus of claim 31, wherein the light filter is mounted on the space end of the receive waveguides.

34. The waveguide apparatus of claim 31, wherein the light filter is embedded in the receive waveguides.

35. The waveguide apparatus of claim 31, wherein the light filter is an interference filter.

36. The waveguide apparatus of claim 31, wherein the light filter is a diffraction grating.

37. The waveguide apparatus of claim 1, wherein the send waveguides are embedded in furrow indentations in the send substrate, and the send optical systems are embedded in well indentations in the send substrate, which indentations are formed by displacing substrate material with a stamping die, to precisely integrate the position of the send waveguides and the send optical systems relative to one another within the send substrate.

38. The waveguide apparatus of claim 1, wherein the send waveguides are embedded in furrow channels in the send substrate, and the send optical systems are embedded in well channels in the send substrate, which channels are formed by altering substrate material through lithography, to precisely integrate the position of the send waveguides and the send optical systems relative to one another within the send substrate.

39. An XY digitizer oriented within an XY coordinate system with respect to a free space region, comprising:

an X send substrate extending generally in the Y direction;

an X receive substrate extending generally in the Y direction and spaced from the X send substrate defining the X dimension of the free space region;

a Y send substrate extending generally in the X direction;

a Y receive substrate extending generally in the X direction and spaced from the Y send substrate defining the Y dimension of the free space region;

X send waveguides embedded in the X send substrate and extending generally in the Y direction;

Y send waveguides embedded in the Y send substrate and extending generally in the X direction;

each send waveguide having a free space end proximate the free space region and a light source end and guides constrained send light from the source end to the space end, the space ends of the send waveguides forming a parallel X send array and forming a parallel Y send array;

the X parallel send array sending a generally parallel array of unconstrained X send light beams generally in the X direction across the free space region to the X receive substrate;

the Y parallel send array sending a generally parallel array of unconstrained Y send light beams generally in the Y direction across the free space region to the Y receive substrate;

X receive waveguides embedded in the X receive substrate and extending generally in the Y direction;

Y receive waveguides embedded in the Y receive substrate and extending generally in the X direction;

each receive waveguide having a free space end proximate the free space region and a light detect end and guides constrained receive light from the space end to the detect end, the space ends of the receive waveguides forming a parallel X receive array and forming a parallel Y receive array;

each receive waveguide of the receive arrays in optical association with a corresponding send waveguide of the send arrays for receiving at least a portion of the light beam from the corresponding send waveguide to become constrained receive light in that receive waveguide;

an array of X send optical systems embedded in the X send substrate between the X send array and the free space region;

an array of Y send optical systems embedded in the Y send substrate between the Y send array and the free space region; and one send optical system in optical alignment with each send waveguide which enhances the collimation of the constrained send light from that aligned send waveguide, for enhancing the collimation of the light beams crossing the free space region causing a higher portion of the light beam to be received by the corresponding receive waveguide.

40. The XY digitizer of claim 39, further comprising:

an array of X receive optical systems embedded in the X receive substrate and extending generally in the Y direction;

an array of Y receive optical systems embedded in the Y receive substrate and extending generally in the X direction;

the receive optical systems positioned between the free space region and receive arrays, one receive optical system in optical alignment with each receive waveguide, for condensing at least a portion of the light beam crossing the free space region from the corresponding send waveguide which is in optical association with that receive waveguide.

41. The XY digitizer of claim 39, further comprising:

an X light source in light communication with the source end of the X send waveguides for providing the send light which forms the X light beams; and a Y light source in light communication with the source end of the Y send waveguides for providing the send light which forms the Y light beams.

42. The XY digitizer of claim 39, further comprising:

X light detectors in light communication with the detect end of the X receive waveguides for detecting light in the X constrained receive light: and Y light detectors in light communication with the detect end of the Y receive waveguide for detecting light in the Y constrained receive light.

43. The XY digitizer of claim 39, further comprising:

an X light filter in light communication with the detect end of the X receive waveguides for filtering light in the constrained receive light; and a Y light filter in light communication with the detect end of the Y receive waveguide for filtering light in the Y constrained receive light.

44. The XY digitizer of claim 39, wherein the X send substrate and the X receive substrate and the Y send substrate and the Y receive substrate form a single piece substrate around the free space region.

45. The XY digitizer of claim 44, further comprising a display monitor supporting the single piece substrate with screen of the monitor coincident with to the free space region.

* * * * *